United States Patent
Chien (10) Patent No.: US 10,002,440 B2
(45) Date of Patent: Jun. 19, 2018

(54) METHOD FOR MEASURING DEPTH OF FIELD AND IMAGE PICKUP DEVICE USING SAME

(71) Applicant: PRIMAX ELECTRONICS LTD., Taipei (TW)

(72) Inventor: Jui-Ting Chien, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 34 days.

(21) Appl. No.: 15/288,344

(22) Filed: Oct. 7, 2016

(65) Prior Publication Data

US 2017/0347014 A1  Nov. 30, 2017

(30) Foreign Application Priority Data

May 27, 2016 (TW) .............................. 105116771 A (51) Int. Cl.
- *G06T 7/586* (2017.01)
- *H04N 13/00* (2018.01)
- *H04N 13/02* (2006.01)

(52) U.S. Cl.
CPC ......... *G06T 7/586* (2017.01); *H04N 13/0271* (2013.01)

(58) Field of Classification Search
CPC .... H04N 5/23212; G06T 7/0069; G02B 7/28; G02B 7/346; G03B 13/36

USPC ......................................................... 348/349
See application file for complete search history.

(56) References Cited

U.S. PATENT DOCUMENTS

| | | | | |
|---|---|---|---|---|
| 2009/0115882 A1* | 5/2009 | Kawarada | .......... | H04N 5/23212 348/340 |
| 2012/0154547 A1* | 6/2012 | Aizawa | .............. | G02B 27/2278 348/47 |
| 2015/0092022 A1* | 4/2015 | Chang | ................ | H04N 13/0011 348/49 |
| 2016/0267666 A1* | 9/2016 | Kim | ................... | H04N 5/23212 |
| 2017/0118398 A1* | 4/2017 | Sano | .................. | H04N 5/23212 |
| 2017/0163873 A1* | 6/2017 | Kim | .................... | H04N 5/23212 |
| 2017/0331997 A1* | 11/2017 | Li | ........................... | H04N 5/235 |
| 2017/0347042 A1* | 11/2017 | Borthakur | .......... | G02B 13/0045 |
| 2017/0374306 A1* | 12/2017 | Vaartstra | ............ | H04N 5/23212 |

* cited by examiner

*Primary Examiner* — Nhan T Tran
(74) *Attorney, Agent, or Firm* — Kirton McConkie; Evan R. Witt (57) ABSTRACT

A method for measuring a depth of field is provided. An initial depth-of-field data is acquired through two optical lens modules and another depth-of-field data is obtained according to the phase detection pixel groups of the image captured by one of the optical lens modules. Consequently, even if objects in the scene are arranged along the same direction as the two optical lens modules, the error of the initial depth-of-field data can be compensated. Moreover, an image pickup device using the method is provided.

10 Claims, 7 Drawing Sheets

METHOD FOR MEASURING DEPTH OF FIELD AND IMAGE PICKUP DEVICE USING SAME

FIELD OF THE INVENTION

The present invention relates to an optical imaging field, and more particularly to a method for measuring a depth of field and an image pickup device using the method.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various image pickup devices are widely used in many kinds of fields such as smart phones, wearable electronic devices, aerial imaging devices or any other appropriate electronic devices. Since the image pickup devices are small and portable, the users can take the image pickup devices to capture images and store the images at any time according to the users' requirements. Alternatively, the images can be uploaded to the internet through mobile networks. In other words, these electronic devices not only have important commercial values but also provide more colorful lives to people. With the improvement of the living quality, people's demands on the images are gradually increased. For example, many people are willing to acquire the images with higher quality or more imaging effects.

Figure 1:
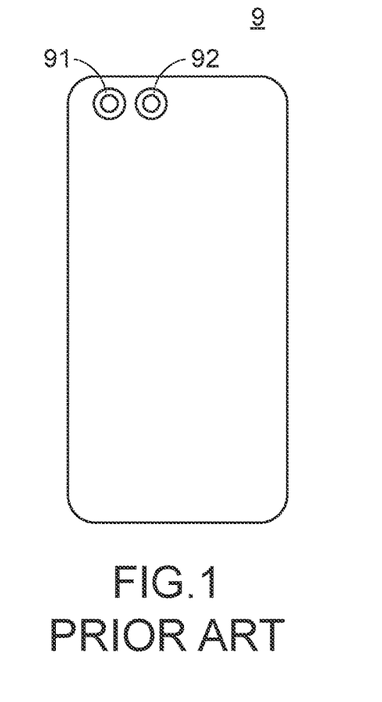
FIG. 1 schematically illustrates the appearance of an existing smart phone.

FIG. 1 schematically illustrates the appearance of an existing smart phone. The smart phone 9 comprises two optical lens modules 91 and 92, which are in parallel with each other. These two optical lens modules 91 and 92 can shoot the scene at different angles. After two images are captured by the two optical lens modules 91 and 92, the two images are analyzed and calculated. Consequently, a stereoscopic image with the depth-of-field data is obtained. Nowadays, the smart phone 9 with two optical lens modules 91 and 92 is produced by HTC Corporation, Sony Corporation, LG Corporation, Huawei Technologies Co. Ltd, or the like. The technologies of using two optical lens modules 91 and 92 to obtain the depth-of-field data are well known to those skilled in the art, and are not redundantly described herein.

However, the method of using the two optical lens modules 91 and 92 to shoot the same scene to acquire the depth-of-field data still has some drawbacks. For example, if two objects in the scene are arranged along the same direction as the two optical lens modules, the two objects are in parallel with respect to the smart phone 9. Under this circumstance, it is difficult to judge the depth-of-field data of the two objects, and the obtained depth-of-field data have errors. In other words, the conventional method for acquiring the depth-of-field data of the image needs to be further improved.

SUMMARY OF THE INVENTION

An object of the present invention provides a method for measuring a depth of field. An initial depth-of-field data is acquired through two optical lens modules and another depth-of-field data is obtained according to the phase detection pixel groups of the image captured by one of the optical lens modules. Consequently, even if objects in the scene are arranged along the same direction as the two optical lens modules, the error of the initial depth-of-field data can be compensated.

Another object of the present invention provides an image pickup device. The image pickup device uses a method for measuring a depth of field.

In accordance with an aspect of the present invention, there is provided a method for measuring a depth of field. The method includes the following steps. Firstly, a first image is captured by a first optical lens module, and a second image is captured by the second optical lens module. The first image contains plural phase detection pixel groups, and the first image is segmented into plural imaging areas. Then, a first local depth-of-field data of each imaging area is acquired according to a difference between the first image and the second image. Then, a horizontal image intensity and a vertical image intensity of the first local depth-of-field data corresponding to each imaging area are calculated, and the first local depth-of-field data or a second local depth-of-field data is determined as a selected local depth-of-field data of the imaging area according to the horizontal image intensity and the vertical image intensity. The second local depth-of-field data is obtained according to at least portions of the plural phase detection pixel groups.

In accordance with another aspect of the present invention, there is provided an image pickup device. The image pickup device includes a first optical lens module, a second optical lens module, a first sensing element, a second sensing element, and a calculating module. After light beams passing through the first optical lens module are projected on the first sensing element, the first sensing element senses the light beams and acquires a first image. The first image is segmented into plural imaging areas. The first sensing element includes plural phase detection unit groups. The first image contains plural phase detection pixel groups corresponding to the plural phase detection unit groups. After light beams passing through the second optical lens module are projected on the second sensing element, the second sensing element senses the light beams and acquires a second image. The calculating module is connected with the first sensing element and the second sensing element. The calculating module calculates a first local depth-of-field data of each imaging area according to a difference between the first image and the second image, calculates a horizontal image intensity and a vertical image intensity of the first local depth-of-field data corresponding to each imaging area, and determines the first local depth-of-field data or a second local depth-of-field data as a selected local depth-of-field data of the imaging area according to the horizontal image intensity and the vertical image intensity. The second local depth-of-field data is obtained according to at least portions of the plural phase detection pixel groups.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
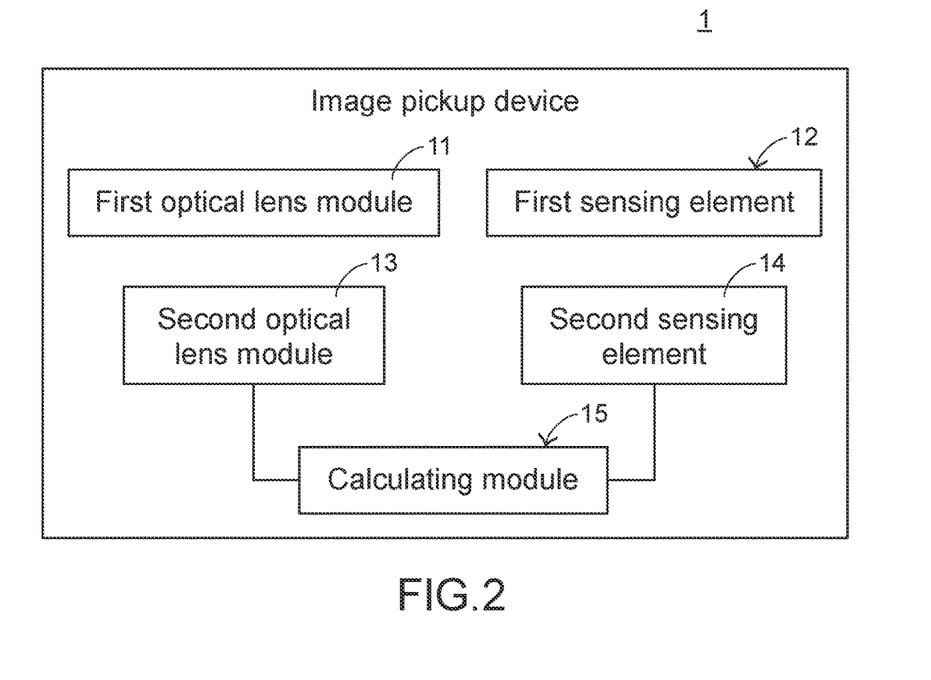
FIG. 2 is a schematic functional block illustrating an image pickup device according to an embodiment of the present invention.
Figure 3:
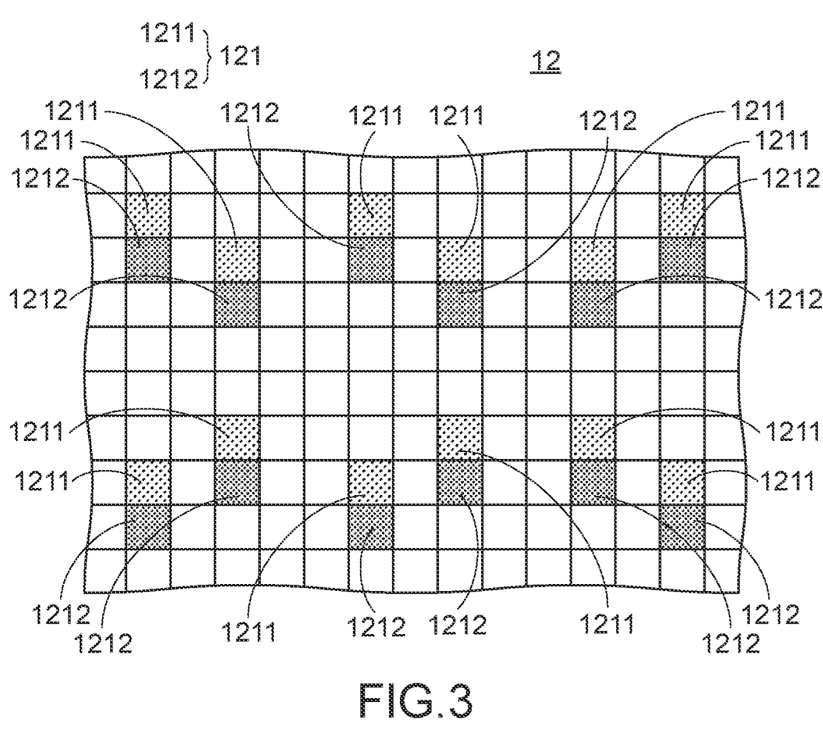
FIG. 3 schematically illustrates a first sensing element of the image pickup device of FIG. 2.

Hereinafter, the components of an image pickup device of the present invention will be illustrated with reference to FIGS. 2 and 3. FIG. 2 is a schematic functional block illustrating an image pickup device according to an embodiment of the present invention. FIG. 3 schematically illustrates a first sensing element of the image pickup device of FIG. 2. The image pickup device 1 comprises a first optical lens module 11, a first sensing element 12, a second optical lens module 13, a second sensing element 14 and a calculating module 15. The first optical lens module 11 and the second optical lens module 13 are arranged along a horizontal direction. After the light beams passing through the first optical lens module 11 are projected on the first sensing element 12, a first image is acquired by the first sensing element 12. After the light beams passing through the second optical lens module 13 are projected on the second sensing element 14, a second image is acquired by the second sensing element 14.

In this embodiment, the first sensing element 12 comprises plural phase detection unit groups 121. Each phase detection unit group 121 comprises a first incident light phase detection unit 1211 and a second incident light phase detection unit 1212. The second incident light phase detection unit 1212 is perpendicular to the first incident light phase detection unit 1211. The calculating module 15 is connected with the first sensing element 12 and the second sensing element 14. Consequently, the calculating module 15 receives the first image from the first sensing element 12 and the second image from the second sensing element 14.

Figure 4:
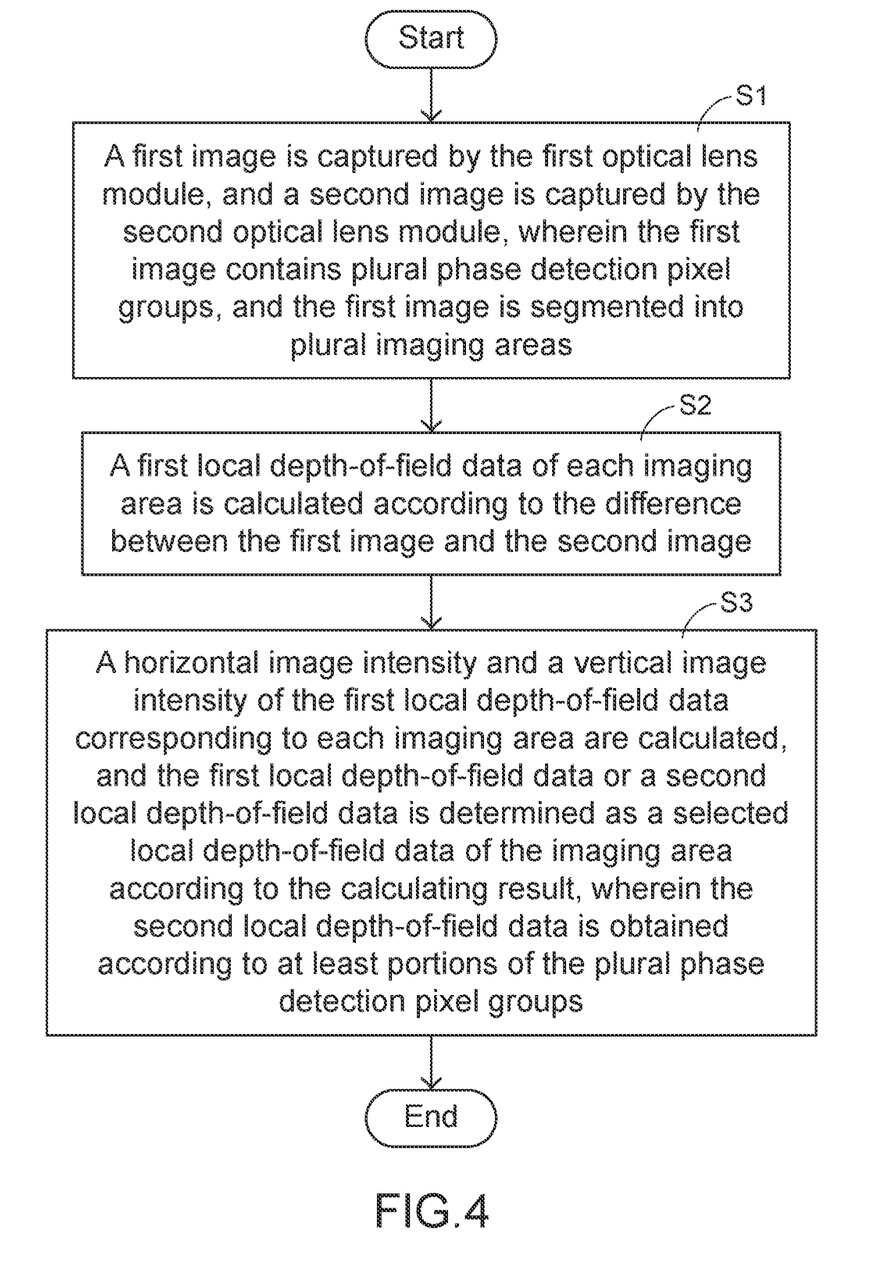
FIG. 4 is a flowchart illustrating a method for measuring a depth of field according to an embodiment of the present invention.
Figure 5A:
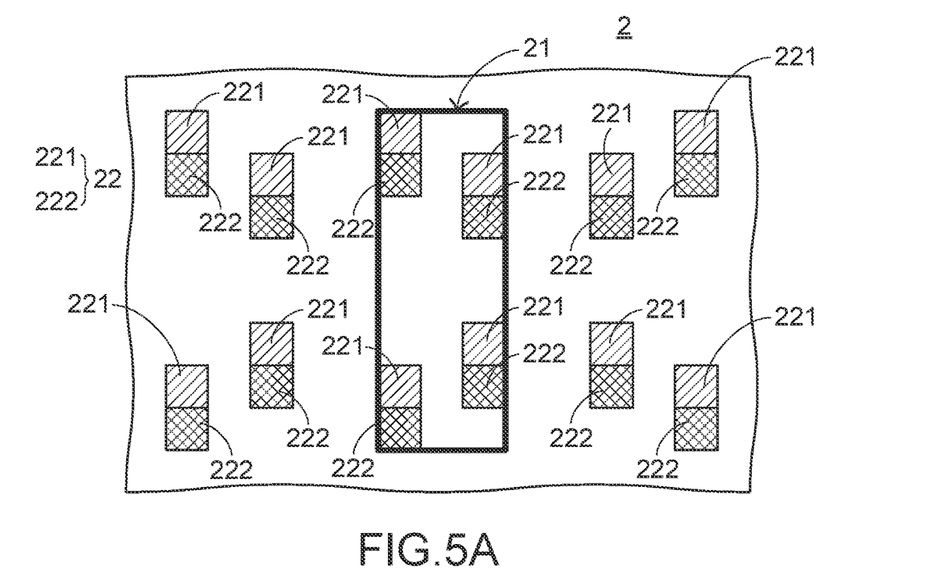
FIG. 5A schematically illustrates a first image obtained in the step S1 of the method of FIG. 4.
Figure 5B:
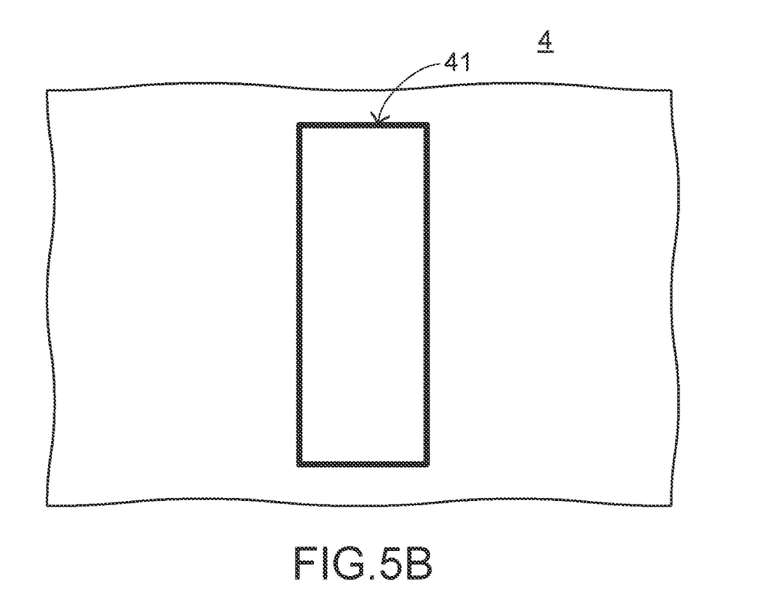
FIG. 5B schematically illustrates a second image obtained in the step S1 of the method of FIG. 4.

Hereinafter, a method for measuring a depth of field by the image pickup device will be illustrated with reference to FIGS. 4, 5A and 5B. FIG. 4 is a flowchart illustrating a method for measuring a depth of field according to an embodiment of the present invention. FIG. 5A schematically illustrates a first image obtained in the step S1 of the method of FIG. 4. FIG. 5B schematically illustrates a second image obtained in the step S1 of the method of FIG. 4. The method for measuring the depth of field comprises steps S1~S3. The steps S1~S3 will be described in more details as follows.

When the image pickup device 1 is ready to shoot a scene, the step S1 is performed. After the light beams passing through the first optical lens module 11 are projected on the first sensing element 12, a first image 2 is acquired by the first sensing element 12. After the light beams passing through the second optical lens module 13 are projected on the second sensing element 14, a second image 4 is acquired by the second sensing element 14. The first image 2 is segmented into plural imaging areas. Each imaging area contains at least one pixel. For clarification, only one imaging area 21 of these imaging areas is marked in the first image 2 of FIG. 5A. Similarly, the second image 4 is segmented into plural imaging areas. For clarification, only one imaging area 41 of these imaging areas is marked in the second image 4 of FIG. 5B. The imaging area 41 corresponds to the imaging area 21.

Since the first sensing element 12 comprises plural phase detection unit groups 121, the acquired first image 2 contains plural phase detection pixel groups 22 corresponding to the plural phase detection unit groups 121. As shown in FIG. 5A, each phase detection pixel group 22 comprises a first incident light portion 221 corresponding to the first incident light phase detection unit 1211 and a second incident light portion 222 corresponding to the second incident light phase detection unit 1212.

In this embodiment, the first incident light portion 221 is an upper incident light portion, and the second incident light portion 222 is a lower incident light portion. Moreover, the first incident light portion 221 and the second incident light portion 222 are included in the same pixel. It is noted that numerous modifications and alterations may be made while retaining the teachings of the invention. For example, in another embodiment, the first incident light portion 221 is a lower incident light portion, and the second incident light portion 222 is an upper incident light portion. Alternatively, the first incident light portion 221 and the second incident light portion 222 are included in different pixels.

In the step S2, the calculating module 15 calculates the difference between the first image 2 and the second image 4 in order to acquire a first local depth-of-field data of each imaging area. Please refer to FIGS. 5A and 5B. Since the imaging area 21 of the first image 2 corresponds to the imaging area 41 of the second image 4, the first local depth-of-field data of the imaging area 21 of the first image 2 is acquired by the calculating module 15 according to the difference between the imaging area 21 and the imaging area 41. The ways of acquiring the first local depth-of-field data of the other imaging areas are similar.

In an embodiment, the difference between the first image and the second image is obtained by calculating peak signal-to-noise ratios (PSNR). Generally, the peak signal-to-noise ratio is an objective standard of evaluating the similarity of two patterns. A higher peak signal-to-noise ratio indicates a smaller phase difference. It is noted that the standard of evaluating the difference between the first image and the second image may be varied according to the practical requirements. For example, in another embodiment, the difference between the first image and the second image is obtained by a zero mean normalized cross correlation (ZNCC) method. The way of acquiring the first local depth-of-field data of each imaging area according to the difference between the first image and the second image and the method of obtaining the difference between the first image and the second image according to the PSNR or the ZNCC method are well known to those skilled in the art, and are not redundantly described herein.

In the step S3, the calculating module 15 calculates a horizontal image intensity and a vertical image intensity of the first local depth-of-field data corresponding to each imaging area of the first image 2, and determines the first local depth-of-field data or a second local depth-of-field data as a selected local depth-of-field data of the imaging area according to the calculating result. The second local depth-of-field data of each imaging area is obtained according to at least portions of the plural phase detection pixel groups 22 of the first image 2. Afterwards, the selected local depth-of-field data of all imaging areas of the first image 2 obtained in the step S3 are combined as an overall depth-of-field data of the first image 2 by the calculating module 15.

If the horizontal image intensity is higher than the vertical image intensity in the first local depth-of-field data of each imaging area of the first image 2, it means that a less number of vertical image data are included in this imaging area. Consequently, the second local depth-of-field data of this imaging area is obtained according to at least portions of the plural phase detection pixel groups 22 of the first image 2. In each phase detection unit group 121, the first incident light phase detection unit 1211 and the second incident light phase detection unit 1212 are perpendicular to each other. That is, the second local depth-of-field data of this imaging area contains more vertical image data. Under this circumstance, the calculating module 15 determines the second local depth-of-field data of this imaging area as the selected local depth-of-field data of the imaging area. Whereas, if the vertical image intensity is higher than the horizontal image intensity in the first local depth-of-field data of each imaging area of the first image 2, it means that a sufficient number of vertical image data are included in this imaging area. Under this circumstance, the calculating module 15 directly determines the first local depth-of-field data of this imaging area as the selected local depth-of-field data of the imaging area.

In an embodiment, the horizontal image intensity and the vertical image intensity of the first local depth-of-field data corresponding to each imaging area of the first image 2 are calculated according to mask operators. Particularly, the horizontal image intensity is calculated according to a Prewitt operator $f_x$, and the vertical image intensity is calculated according to another Prewitt operator $f_y$. The Prewitt operators $f_x$ and $f_y$ are expressed as:

$$f_x = \begin{matrix} -1 & 0 & 1 \\ -1 & 0 & 1, \\ -1 & 0 & 1 \end{matrix}$$

$$f_y = \begin{matrix} 1 & 1 & 1 \\ 0 & 0 & 0 \\ -1 & -1 & -1 \end{matrix}.$$

It is noted that the ways of calculating the horizontal image intensity and the vertical image intensity are not restricted. Moreover, the ways of calculating the horizontal image intensity and the vertical image intensity through the mask operators (e.g., the Prewitt operators) are well known to those skilled in the art, and are not redundantly described herein.

Figure 6:
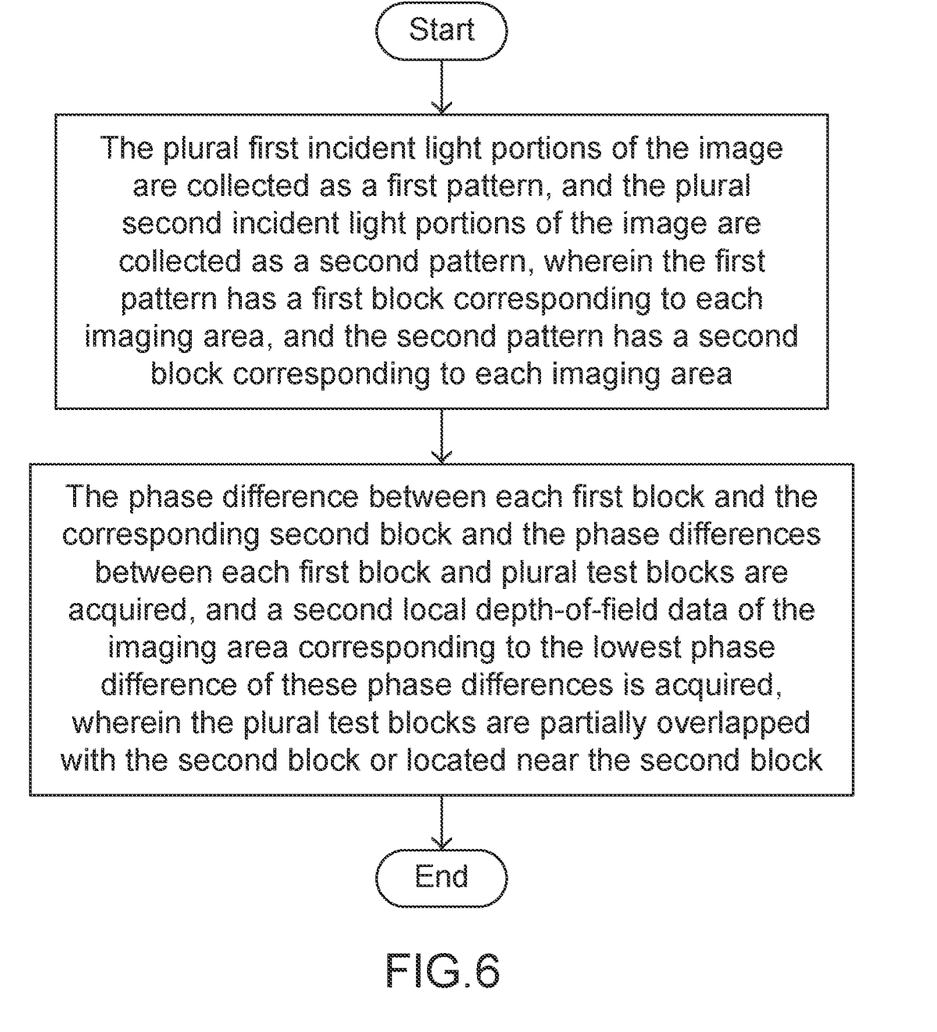
FIG. 6 is a flowchart illustrating the procedure of obtaining the second local depth-of-field data of each imaging area of the first image in the step S3 of the method of FIG. 4.
Figure 7A:
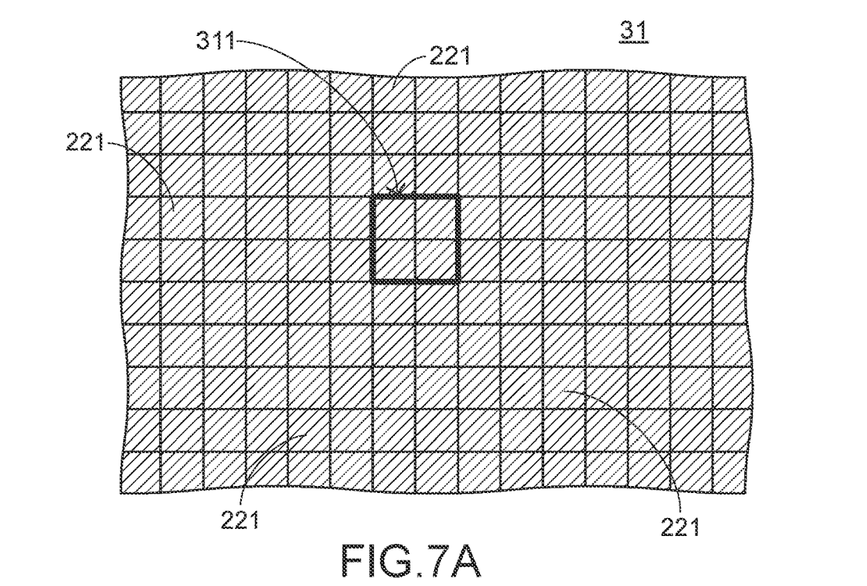
FIG. 7A schematically illustrates a first pattern obtained by the procedure of FIG. 6.
Figure 7B:
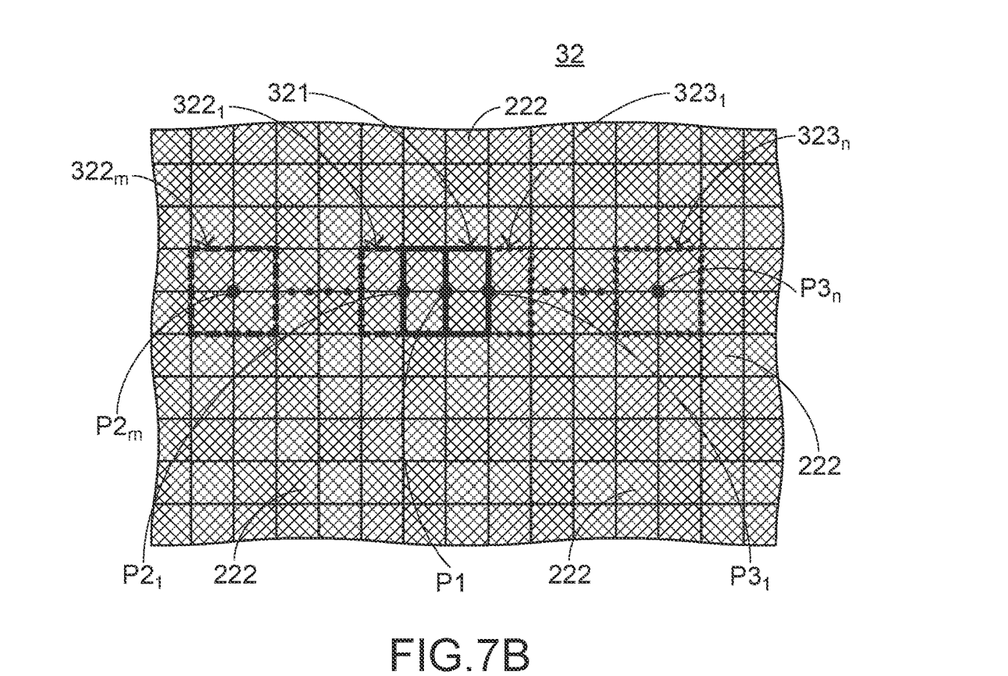
FIG. 7B schematically illustrates a second pattern obtained by the procedure of FIG. 6.
Figure 8:
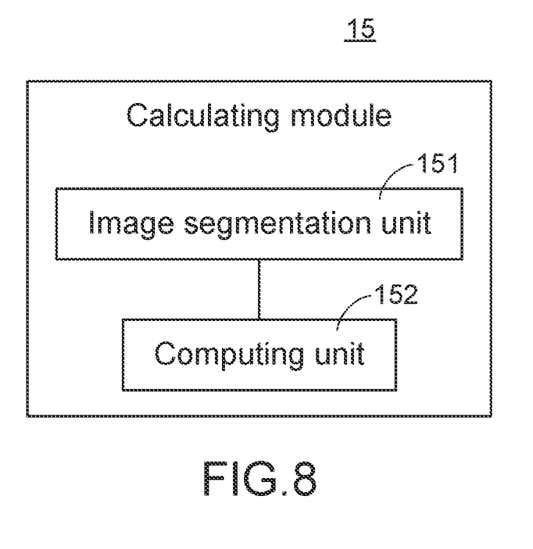
FIG. 8 is a schematic functional block diagram illustrating the calculating module of the image pickup device of FIG. 2 according to an embodiment of the present invention.

Hereinafter, a procedure for obtaining the second local depth-of-field data of each imaging area according to at least portions of the plural phase detection pixel groups 22 of the first image 2 will be illustrated with reference to FIGS. 6, 7A, 7B and 8. FIG. 6 is a flowchart illustrating the procedure of obtaining the second local depth-of-field data of each imaging area of the first image in the step S3 of the method of FIG. 4. FIG. 7A schematically illustrates a first pattern obtained by the procedure of FIG. 6. FIG. 7B schematically illustrates a second pattern obtained by the procedure of FIG. 6. FIG. 8 is a schematic functional block diagram illustrating the calculating module of the image pickup device of FIG. 2 according to an embodiment of the present invention.

In this embodiment, the calculating module 15 of the image pickup device 1 comprises an image segmentation unit 151 and a computing unit 152. The image segmentation unit 151 collects the plural first incident light portions 221 of the first image 2 as a first pattern 31 and collects the plural second incident light portions 222 of the first image 2 as a second pattern 32. The first pattern 31 and the second pattern 32 are shown in FIGS. 7A and 7B, respectively. Moreover, the first pattern 31 has plural first blocks 311 corresponding to the plural imaging areas of the first image 2, and the second pattern 32 has plural second blocks 321 corresponding to the plural imaging areas of the first image 2. For clarification, only one first block 311 of the plural first blocks corresponding to the imaging area 21 of FIG. 5A is marked in the first pattern 31 of FIG. 7A, and only one second block 321 of the plural second blocks 321 corresponding to the imaging area 21 of FIG. 5A is marked in the second pattern 32 of FIG. 7B. Then, the first pattern 31 and the second pattern 32 from the image segmentation unit 151 are received by the computing unit 152. The computing unit 152 acquires the phase difference between each first block and the corresponding second block, and acquires the phase differences between the each first block and plural test blocks. Then, a local depth-of-field data of the imaging area of the first image 2 corresponding to the lowest phase difference of these phase differences is acquired. The plural test blocks are partially overlapped with the corresponding second blocks or located near the corresponding second blocks.

Hereinafter, the operating principles of the present invention will be illustrated with reference to the imaging area 21 of FIG. 5A, the first block 311 of FIG. 7A and the second block 321 of FIG. 7B. The computing unit 152 acquires the phase difference $E_1$ between the first block 311 and the second block 321, and acquires the phase differences $E_{21}$, $E_{22}$, ..., $E_{2m}$, $E_{31}$, $E_{32}$, ..., $E_{3n}$ between the first block 311 and plural test blocks $322_1$, $322_2$, ..., $322_m$, $323_1$, $323_2$, ..., $323_n$. The plural test blocks $322_1$, $322_2$, ..., $322_m$, $323_1$, $323_2$, ..., $323_n$ are partially overlapped with the corresponding second block 321 or located near the corresponding second block 321 along a horizontal direction.

In this embodiment, the center positions $P_{21}$, $P_{22}$, ..., $P_{2m}$ of the test blocks $322_1$, $322_2$, ..., $322_m$ of the plural test blocks $322_1$, $322_2$, ..., $322_m$, $323_1$, $323_2$, ..., $323_n$ are located at the left side of the center position $P_1$ of the second block 321, and the center positions $P_{31}$, $P_{32}$, ..., $P_{3m}$ of the test blocks $323_1$, $323_2$, ..., $323_n$ of the plural test blocks $322_1$, $322_2$, ..., $322_m$, $323_1$, $323_2$, ..., $323_n$ are located at the right side of the center position $P_1$ of the second block 321. The second block 321 and the plural test blocks $322_1$, $322_2$, ..., $322_m$, $323_1$, $323_2$, ..., $323_n$ have the same size. The selections of the plural test blocks $322_1$, $322_2$, ..., $322_m$, $323_1$, $323_2$, ..., $323_n$ are presented herein for purpose of illustration and description only. It is noted that the selections of the plural test blocks may be varied according to the practical requirements. For example, in another embodiment, the plural test blocks are partially overlapped with the corresponding second block or located near the corresponding second block along a vertical direction.

Generally, the focused area of the first image 2 is associated with the depth of field of the first image. In case that the imaging area 21 of the first image 2 is the focused area, the phase difference $E_1$ between the first block 311 and the second block 321 is zero or very small. Whereas, in case that the phase difference $E_1$ between the first block 311 and the second block 321 is zero or very small, the imaging area 21 of the first image 2 is not the focused area. Then, among the phase difference between the second blocks 321 and the first block 311 and the phase differences between the and the plural test blocks $322_1, 322_2, \ldots, 322_m, 323_1, 323_2, \ldots, 323_n$, and the first block 311, the lowest phase difference is selected. The imaging area 21 of the first image 2 corresponding to the lowest phase difference indicates the focused area. Then, the second local depth-of-field data of the imaging area 21 is acquired.

In this embodiment, the second local depth-of-field data is expressed by $-m, \ldots, -2, -1, 0, 1, 2, \ldots, n$. For example, if the phase difference between the first block 311 and the test block $322_m$ is the lowest, the second local depth-of-field data of the imaging area 21 is $-m$. Moreover, if the phase difference between the first block 311 and the test block $322_2$ is the lowest, the second local depth-of-field data of the imaging area 21 is $-2$. Moreover, if the phase difference between the first block 311 and the test block 321 is the lowest, the second local depth-of-field data of the imaging area 21 is 0. Moreover, if the phase difference between the first block 311 and the test block $323_1$ is the lowest, the second local depth-of-field data of the imaging area 21 is 1. Moreover, if the phase difference between the first block 311 and the test block $323_n$ is the lowest, the second local depth-of-field data of the imaging area 21 is n. If the phase difference between the first block 311 and another test block is the lowest, the rest of the second local depth-of-field data of the imaging area 21 may be deduced by analogy. It is noted that the way of expressing the second local depth-of-field data is not restricted.

In this embodiment, the phase difference $E_1$ between the first block 311 and the second block 321 and the phase differences $E_{21}, E_{22}, \ldots, E_{2m}, E_{31}, E_{32}, \ldots, E_{3n}$ between the first block 311 and plural test blocks $322_1, 322_2, \ldots, 322_m, 323_1, 323_2, \ldots, 323_n$ are obtained by calculating peak signal-to-noise ratios (PSNR). Generally, the peak signal-to-noise ratio is an objective standard of evaluating the similarity of two patterns. A higher peak signal-to-noise ratio indicates a smaller phase difference. The relationship between the peak signal-to-noise ratio and the phase difference is well known to those skilled in the art, and is not redundantly described herein.

It is noted that the standard of evaluating the phase difference is not restricted to the peak signal-to-noise ratio. That is, the standard of evaluating the phase difference may be varied according to the practical requirements. In another embodiment, the phase difference $E_1$ between the first block 311 and the second block 321 and the phase differences $E_{21}, E_{22}, \ldots, E_{2m}, E_{31}, E_{32}, \ldots, E_{3n}$ between the first block 311 and plural test blocks $322_1, 322_2, \ldots, 322_m, 323_1, 323_2, \ldots, 323_n$ are obtained by a zero mean normalized cross correlation (ZNCC) method. The ZNCC method is well known to those skilled in the art, and is not redundantly described herein.

After the phase difference $E_1$ between the first block 311 and the second block 321 and the phase differences $E_{21}, E_{22}, \ldots, E_{2m}, E_{31}, E_{32}, \ldots, E_{3n}$ between the first block 311 and plural test blocks $322_1, 322_2, \ldots, 322_m, 323_1, 323_2, \ldots, 323_n$ are acquired by calculating the peak signal-to-noise ratios (PSNR) or using the ZNCC method, the computing unit 14 acquires the lowest phase different among these phase differences $E_1, E_{21}, E_{22}, \ldots, E_{2m}, E_{31}, E_{32}, \ldots, E_{3n}$. According to the lowest phase difference, the second local depth-of-field data of the imaging area 21 of the first image 2 is obtained.

Similarly, the second local depth-of-field data of any other imaging area 21 of the first image 2 can be obtained according to the above method through the relationship between the first block of the first pattern 31 and the image area and the relationship between the second block of the second pattern 32 and the image area. Moreover, the procedure for obtaining the second local depth-of-field data of each imaging area according to at least portions of the plural phase detection pixel groups 22 of the first image 2 is not restricted to the procedure of FIG. 6.

From the above descriptions, the present invention provides an image pickup device and a method for measuring a depth of field. In accordance with the present invention, an initial depth-of-field data is acquired through two optical lens modules and another depth-of-field data is obtained according to the phase detection pixel groups of the image captured by one of the optical lens modules. Consequently, even if objects in the scene are arranged along the same direction as the two optical lens modules, the error of the initial depth-of-field data can be compensated. Generally, if only one optical lens module is used to capture the image and the depth-of-field data is obtained according to the phase detection pixel groups of the image captured by one of this optical lens module, the imaging quality is impaired because the scene brightness is insufficient or the object is in the smooth region (i.e., the region with low contrast). The image pickup device and the method of the present invention can overcome the above drawbacks.

It is noted that numerous modifications and alterations may be made while retaining the teachings of the invention. For example, in a variant example, the first optical lens module 11 and the second optical lens module 13 of the image pickup device 1 as shown in FIG. 2 are arranged along a vertical direction. In addition, the first incident light phase detection unit 1211 and the second incident light phase detection unit 1212 of each phase detection unit group 121 are arranged along a horizontal direction. Moreover, the first incident light portion 221 corresponding to the first incident light phase detection unit 1211 is a left incident light portion, and the second incident light portion 222 corresponding to the second incident light phase detection unit 1212 is a right incident light portion. Alternatively, the first incident light portion 221 is a right incident light portion, and the second incident light portion 222 is a left incident light portion. Under this circumstance, the step S3 of FIG. 3 is correspondingly modified. If the horizontal image intensity is higher than the vertical image intensity in the first local depth-of-field data of each imaging area of the first image 2, the calculating module 15 directly determines the first local depth-of-field data of this imaging area as the selected local depth-of-field data of the imaging area. Whereas, if the vertical image intensity is higher than the horizontal image intensity in the first local depth-of-field data of each imaging area of the first image 2, the calculating module 15 determines the second local depth-of-field data of this imaging area as the selected local depth-of-field data of the imaging area.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A method for measuring a depth of field, the method comprising steps of:
   (a) capturing a first image by a first optical lens module, and capturing a second image by the second optical lens module, wherein the first image contains plural phase detection pixel groups, and the first image is segmented into plural imaging areas;
   (b) acquiring a first local depth-of-field data of each imaging area according to a difference between the first image and the second image; and
   (c) calculating a horizontal image intensity and a vertical image intensity of the first local depth-of-field data corresponding to each imaging area, and determining the first local depth-of-field data or a second local depth-of-field data as a selected local depth-of-field data of the imaging area according to the horizontal image intensity and the vertical image intensity, wherein the second local depth-of-field data is obtained according to at least portions of the plural phase detection pixel groups.

2. The method according to claim 1, wherein the difference between the first image and the second image in the step (b) is obtained by calculating a peak signal-to-noise ratio (PSNR), or the difference between the first image and the second image in the step (b) is obtained by a zero mean normalized cross correlation (ZNCC) method.

3. The method according to claim 1, wherein the plural phase detection pixel groups comprise plural first incident light portions and plural second incident light portions, respectively, wherein the first optical lens module and the second optical lens module are arranged along a first direction, the first incident light portions and the second incident light portions are arranged along a second direction, and the first direction and the second direction are perpendicular to each other.

4. The method according to claim 3, wherein the first optical lens module and the second optical lens module are arranged along a horizontal direction, wherein in the step (c), the second local depth-of-field data is determined as the selected local depth-of-field data if the horizontal image intensity is higher than the vertical image intensity in the first local depth-of-field data of each imaging area, and the first local depth-of-field data is determined as the selected local depth-of-field data if the horizontal image intensity is lower than the vertical image intensity in the first local depth-of-field data of each imaging area.

5. The method according to claim 3, wherein the first optical lens module and the second optical lens module are arranged along a vertical direction, wherein in the step (c), the first local depth-of-field data is determined as the selected local depth-of-field data if the horizontal image intensity is higher than the vertical image intensity in the first local depth-of-field data of each imaging area, and the second local depth-of-field data is determined as the selected local depth-of-field data if the horizontal image intensity is lower than the vertical image intensity in the first local depth-of-field data of each imaging area.

6. The method according to claim 1, wherein in the step (c), the horizontal image intensity and the vertical image intensity of the first local depth-of-field data corresponding to each imaging area are calculated according to mask operators.

7. The method according to claim 6, wherein the horizontal image intensity is calculated according to a Prewitt operator $f_x$, and the vertical image intensity is calculated according to another Prewitt operator $f_y$, wherein the Prewitt operators $f_x$ and $f_y$ are expressed as:

$$f_x = \begin{matrix} -1 & 0 & 1 \\ -1 & 0 & 1 \\ -1 & 0 & 1 \end{matrix},$$

$$f_y = \begin{matrix} 1 & 1 & 1 \\ 0 & 0 & 0 \\ -1 & -1 & -1 \end{matrix}.$$

8. The method according to claim 1, wherein the plural phase detection pixel groups comprise plural first incident light portions and plural second incident light portions, respectively, wherein the second local depth-of-field data of each imaging area is obtained by steps of:
   collecting the plural first incident light portions as a first pattern, and collecting the plural second incident light portions as a second pattern, wherein the first pattern has a first block corresponding to each imaging area, and the second pattern has a second block corresponding to each imaging area; and
   acquiring a phase difference between each first block and the corresponding second block and phase differences between the first block and plural test blocks, and acquiring the second local depth-of-field data of the imaging area corresponding to the lowest phase difference of the plural phase differences, wherein the plural test blocks are partially overlapped with the corresponding second block or located near the corresponding second block.

9. The method according to claim 8, wherein the plural phase differences are obtained by calculating peak signal-to-noise ratios, or the plural phase differences are obtained by a zero mean normalized cross correlation (ZNCC) method.

10. The method according to claim 8, wherein the first incident light portion and the second incident light portion are respectively an upper incident light portion and a lower incident light portion, or the first incident light portion and the second incident light portion are respectively a left incident light portion and a right incident light portion.

* * * * *